No. 714,360. Patented Nov. 25, 1902.
H. W. BUCK.
SYSTEM OF ELECTRIC DISTRIBUTION.
(Application filed Mar. 4, 1899.)
(No Model.) 2 Sheets—Sheet 1.
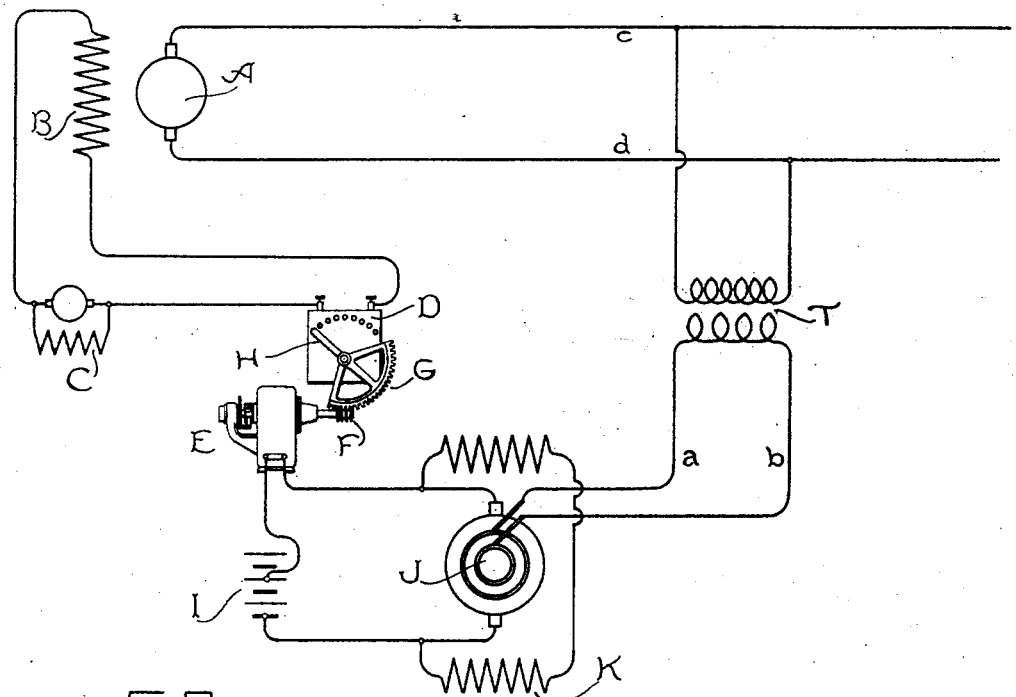
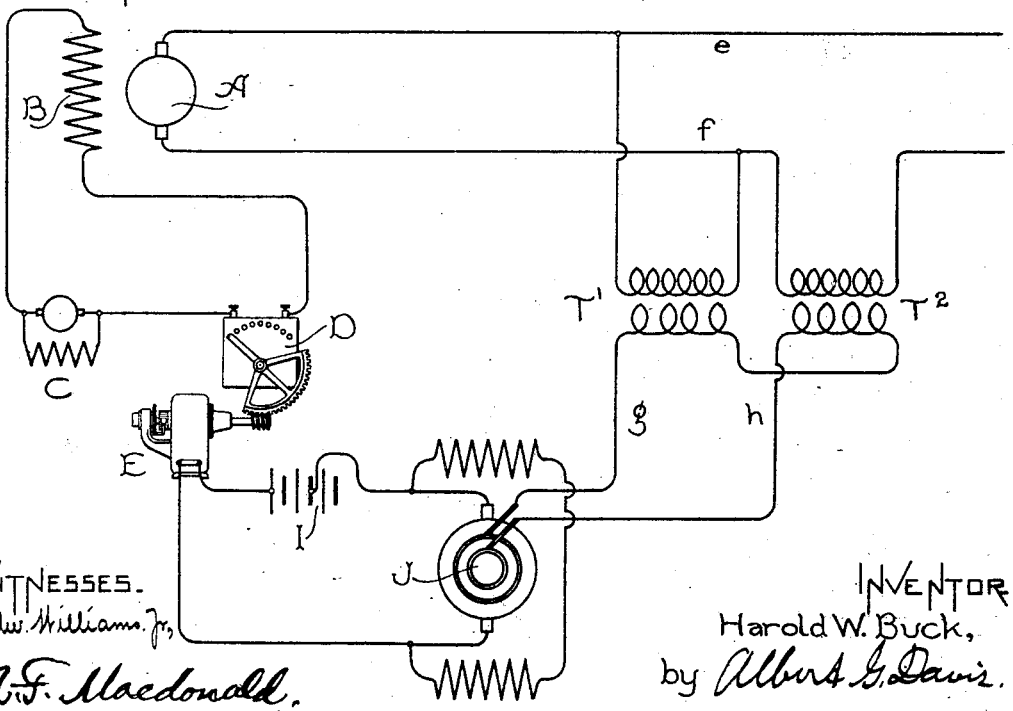
WITNESSES.
Edw. Williams Jr.
A. F. Macdonald.
INVENTOR
Harold W. Buck,
by Albert G. Davis.
Atty.

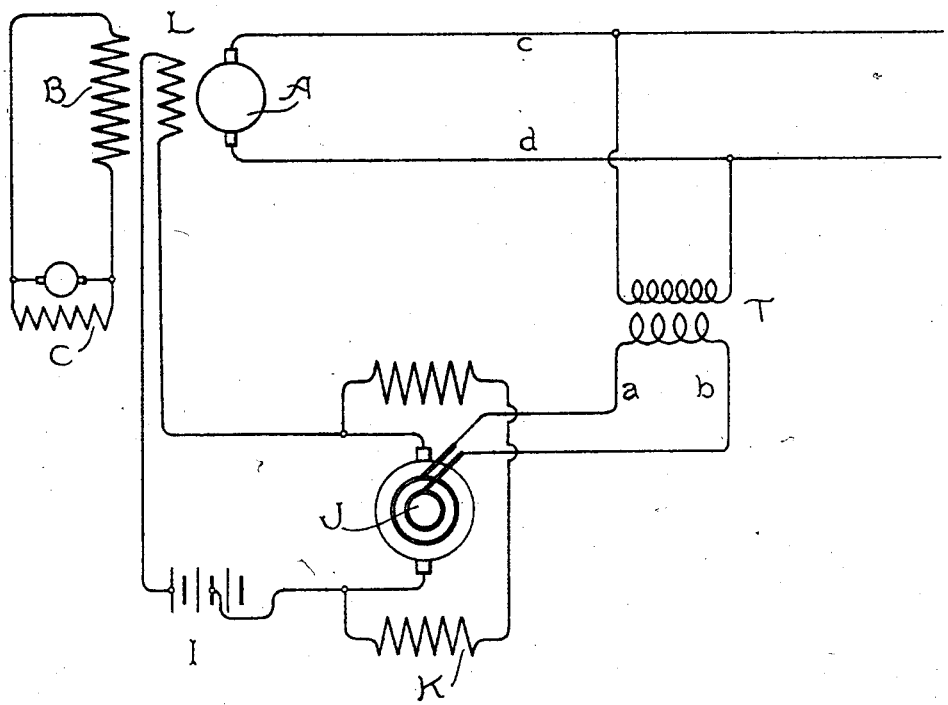

UNITED STATES PATENT OFFICE.

HAROLD W. BUCK, OF SCHENECTADY, NEW YORK, ASSIGNOR TO THE GENERAL ELECTRIC COMPANY, A CORPORATION OF NEW YORK.

SYSTEM OF ELECTRIC DISTRIBUTION.

SPECIFICATION forming part of Letters Patent No. 714,360, dated November 25, 1902.

Application filed March 4, 1899. Serial No. 707,699. (No model.)

*To all whom it may concern:*

Be it known that I, HAROLD W. BUCK, a citizen of the United States, residing at Schenectady, in the county of Schenectady and State of New York, have invented certain new and useful Improvements in Regulation of Dynamo-Electric Machines, (Case No. 1,059,) of which the following is a specification.

My present invention has reference to the regulation of dynamo-electric machines, and while I consider it valuable in connection with direct-current machines it is more especially applicable to machines of the alternating-current type.

In its general nature my invention consists of automatically-actuated means for varying the field strength of a dynamo-electric machine. The field-controlling means is responsive to changes in direction of current flowing in a circuit in which two electromotive forces are maintained, one of which is substantially constant, while the other varies in response to variation of electromotive force on the mains connected to the dynamo-electric machine. The electromotive forces in this circuit are arranged to balance each other when the electromotive force of the mains is normal, but to cause current to flow in one direction when the electromotive force of the mains drops and to cause a reversal of current when the electromotive force of the mains rises.

My invention will be more clearly understood by reference to the following description, taken in connection with the accompanying drawings, while its scope will be clearly and particularly pointed out in the appended claims.

Figure 1 shows my invention as applied to a dynamo-electric machine for maintaining a constant electromotive force at its terminals. Fig. 2 shows my invention as employed for the purpose of maintaining a constant electromotive force at some point on the mains connected to a dynamo-electric machine. Fig. 3 shows a modification.

In Fig. 1, A indicates the armature of a dynamo-electric machine, the fields of which may be excited either by current derived from the armature or from some independent source, or both, as may be found most desirable. As here shown, however, the field-winding B is supplied with current from a separate exciter C or from some other independent source of electromotive force. The current in the field-winding B is regulated by means of a rheostat D of any suitable form. This rheostat is actuated by power derived from a controlling-motor E. This motor should be of such a type as to reverse its direction of rotation upon reversal of the current supplied. The motor may therefore have a separately - excited field, or, if desired, the field may be made up of permanent magnets. The mechanical connection between the motor E and the rheostat D may be made in any suitable manner, the particular method of connection being immaterial. As here shown, however, the shaft of the motor carries a worm F, meshing with a worm-wheel G, which drives the rheostat-arm H.

The motor E is supplied with energy from a circuit containing two sources of electromotive force arranged in opposition to each other, one source consisting of a storage battery I or other source of approximately constant difference of potential, the other source consisting of a rotary converter, (indicated diagrammatically at J.) The alternating-current mains $a\ b$ of the rotary converter are connected across the mains $c\ d$ of the main dynamo-electric machine either directly or indirectly through a transformer T, as shown. The field-winding K of the rotary converter is fed from the direct-current mains of the machine in the ordinary manner.

The storage battery I from reasons of economy is preferably formed of a small number of cells with a correspondingly small electromotive force. The rotary converter J is of such size and is so proportioned and adjusted that its direct electromotive force exactly balances the electromotive force of the storage battery I when the electromotive force across the terminals of the machine A is normal. Under these conditions no current will flow through the motor E, and the amount of resistance placed in circuit with the field-winding B by the rheostat D remains constant.

If the electromotive force of the machine A were to rise, the electromotive force at the direct - current end of the rotary converter would rise correspondingly, and thus overpower the electromotive force of the storage battery I, thus sending current through the motor E, which is arranged to rotate in such direction under these conditions as to move the arm of the rheostat D, so as to insert resistance in series with the field of the machine A, thus cutting down the electromotive force to the normal value. When this point has been reached, current ceases to flow through the controlling-motor E, and the motor therefore stops.

If the electromotive force at the terminals of the machine A were to fall, the reverse operation would take place. In this case the storage battery I instead of being charged as in the first instance will discharge through the rotary converter, and the reverse direction of current thus produced will cause a rotation in the reverse direction of the motor E, thus ultimately restoring the electromotive force at the terminals of the machine A to its normal value, as will be readily understood.

In Fig. 2 I have shown a means for over-compounding the machine A—in other words, for maintaining a constant electromotive force at the receiving end of the line or at some other point or points distant from the terminals of the machine. In this case, as before, the machine may be excited in any convenient manner, but preferably by means of a field-winding B, receiving its energy from a separate exciter C. A controlling-motor E is used, as in the case shown in Fig. 1, for controlling the amount of resistance placed in series with the winding B by the rheostat D. The details of this arrangement have already been described in connection with Fig. 1. Energy is supplied to the motor E by the storage battery I and the rotary converter J in the same manner as already described, but with this distinction that the electromotive force supplied to the rotary converter does not vary in accordance with the electromotive force across the terminals of the machine A, but, on the contrary, in accordance with the electromotive force at the receiving end of the line or at some other distant point or points. In order to provide means for securing this desired variation in electromotive force at the terminals of the rotary converter J, I make use of two transformers $T'$ and $T^2$, one of which, $T'$, is in shunt across the mains $e\,f$, while the other, $T^2$, is arranged with its primary in series with one of the mains. The secondaries of both transformers are arranged in series with each other, but with the terminals of one of the transformers reversed, so as to bring their electromotive forces into opposition with each other. The mains $g\,h$ leading from these two secondaries are connected to the alternating-current mains of the rotary converter J, as shown.

The two transformers $T'$ and $T^2$ are so proportioned with respect to each other that the drop in electromotive force in the lines $g\,h$ caused by the reversely-acting electromotive force in the series-transformer $T^2$ exactly represents the drop in potential between the terminals of the machine A and the receiving end of the line or other predetermined point. The apparatus is so adjusted as to cause a condition of balance of electromotive forces in the circuits supplying the motor E when the electromotive force at the receiving end of the line is at its normal value. If the electromotive force at this point were, for instance, to drop by reason of increase of current, the electromotive force generated in the secondary of the transformer $T^2$ would increase, while that in the secondary of the transformer $T'$ would remain practically constant. The electromotive force impressed upon the rotary converter J would therefore be decreased, thus causing a corresponding decrease in electromotive force at the terminals of the direct-current end of the rotary, thus allowing the electromotive force of the battery I to predominate. The motor E is thus set in motion and operates to cut out resistance from the field-circuit of the main machine A, thus increasing the electromotive force at its terminals an amount sufficient to compensate for the drop in potential on the line.

My invention is thus applicable for the purpose of regulating the potential at any desired point on the distribution system connected to a dynamo-electric machine, whether the same be distant therefrom or immediately adjacent thereto. Although I have shown my invention as applied to a single-phase alternating-current dynamo-electric machine, I do not desire to be limited thereto, since my invention is equally useful in connection with multiphase machines, as well as direct-current machines. It will also be evident that although I have shown a rheostat in series with the field-winding of a machine it might, if desired, be placed in the field of the exciter or, indeed, in any other relations in which it would act to vary the electromotive force of the main machine. My invention, moreover, is not to be considered as limited to the use of a rheostat as the regulating device, since, broadly considered, my invention covers any dynamo-electric machine regulator or device responsive to changes in direction in current in a controlling-circuit. Instead of regulating the dynamo-electric machine A indirectly by means controlled by an electric motor in the local controlling-circuit, which, as before explained, includes the battery I and rotary converter J, I may, if desired, omit entirely the electric motor and the regulating means immediately controlled thereby and employ in place thereof an additional field-winding on the machine A, this winding being supplied with current derived from the local circuit referred to. Fig. 3 illustrates diagrammatically the application of this arrangement. The dynamo-electric machine A is provided with the usual field-winding B, supplied with current from the exciter C. An additional winding L is also employed, and this winding is fed with current from the circuit, including the storage battery I and the rotary converter J. The rotary converter may be supplied with current through a single transformer T, the primary of which receives its energy from the machine A, or, when desired, an arrangement of transformers may be employed, such as shown in Fig. 2 and the operation of which has already been described. With the exception of the changes pointed out the arrangement shown in Fig. 3 does not materially differ from those shown in the other figures of the drawings.

In all of the figures of the drawings I have shown the storage battery I as consisting of a number of cells, but with less than the whole number included in circuit. This is intended to indicate that the number of cells may be varied at will in any desired way. By such adjustment the electromotive force at the terminals of the machine A or at some predetermined point of the distribution system connected thereto may be made anything desired within limits. Other means for effecting this adjustment might be employed—such, for instance, as varying the electromotive force impressed upon the rotary converter. Such variation may be made in many ways—as, for example, by changing the ratio of transformation of the transformer T or by means of an induction-regulator in the circuit of the transformer.

What I claim as new, and desire to secure by Letters Patent of the United States, is—

1. The combination of a dynamo-electric machine, mains leading therefrom, a rotary converter fed from the mains, a source of constant electromotive force placed in series in the direct-current mains of the rotary converter, and normally balancing the electromotive force impressed thereon by the rotary converter, and means controlled by current in said direct-current mains for varying the field of said dynamo-electric machine.

2. The combination of an alternating-current dynamo-electric machine, mains leading therefrom, a local circuit supplied with two electromotive forces one of which is constant, and the other of which varies in accordance with the variation of electromotive force of the mains, and regulating means controlled by current in the local circuit for varying the field strength of said machine.

3. The combination of a dynamo-electric machine, mains leading therefrom, a local circuit upon which two electromotive forces are impressed, one of which electromotive forces is derived from a source independent of said dynamo-electric machine, and means controlled by current in the local circuit for varying the field strength of the dynamo-electric machine.

4. The combination of a dynamo-electric machine, mains connected thereto, a field-regulating rheostat and actuating means therefor, a circuit including a storage battery and the direct-current end of a rotary converter, the alternating-current end of which is connected across the said mains, and an operative connection between the said circuit and the said actuating means.

5. The combination of a rotary converter, means for impressing an alternating electromotive force upon the converter, a circuit connected to the direct-current end of the converter, and a storage battery and an electric motor in series in said circuit.

6. The combination of a dynamo-electric machine, mains connected thereto, a field-regulating rheostat and actuating means for said rheostat controlled by energy derived from a circuit including two sources of electromotive force arranged in opposition to each other, one of which sources is substantially constant while the other varies in response to variations of electromotive force of the mains.

7. The combination of a dynamo-electric machine, mains connected thereto, a regulator for said machine, and actuating means therefor controlled by energy derived from a circuit including a source of constant electromotive force and a source of electromotive force which varies in response to variations of electromotive force of the mains.

8. The combination of a dynamo-electric machine, mains connected thereto, a rheostat in the field of the machine, an electric motor for operating the rheostat, a rotary converter having one set of terminals connected across said mains and the other set of terminals to a circuit for supplying energy to said motor, and a source of constant electromotive force in said circuit.

9. The combination of a dynamo-electric machine, a rheostat arranged to vary the field excitation of the dynamo-electric machine, an electric motor for actuating the rheostat, a circuit for supplying energy to the motor and two relatively variable sources of electromotive force in said circuit.

10. The combination of a dynamo-electric machine, an electric motive device operatively connected to a device for varying the field excitation of the machine, a circuit for controlling said motive device and two relatively variable sources of electromotive force in said circuit.

11. The combination of a dynamo-electric machine, a device for causing a variation in field excitation of the machine, an electric motive device operatively connected thereto, a circuit for controlling said motive device and a plurality of normally-balanced sources of electromotive force in said circuit.

12. The combination of a dynamo-electric machine, a device for causing a variation in field excitation of the machine, an electric motive device operatively connected therewith, a circuit for supplying energy to the motive device and two normally-balanced sources of electromotive force in said circuit.

13. The combination of a dynamo-electric machine, mains connected thereto, a device for causing a variation in field excitation of the machine, an electromotive device operatively connected therewith, a circuit for supplying energy to the motive device and means for causing a current to flow in said circuit when the electromotive force of said mains rises above or falls below the normal.

14. The combination of a dynamo-electric machine, mains connected thereto, a device for causing a variation in field excitation of the machine, an electric motive device operatively connected therewith, a circuit for supplying energy to the motive device and means for causing current to flow in said circuit when the electromotive force at some predetermined point on the mains rises above or falls below the normal.

15. The combination of a dynamo-electric machine, mains connected thereto, a device for causing a variation in field excitation of the machine, an electric motive device operatively connected therewith, a circuit for supplying energy to the motive device and means for causing current to flow in said circuit when the electromotive force at the receiving end of the line rises above or falls below the normal.

16. The combination of a dynamo-electric machine, mains connected thereto, a device for causing a variation in field excitation of the machine, an electric motive device operatively connected therewith, a circuit for supplying energy to the motive device, a plurality of sources of electromotive force in said circuit, one of which sources consists of a rotary converter supplied with current from the secondaries of two transformers the primaries of which are connected, one in shunt to the mains, the other in series with one of the mains.

In witness whereof I have hereunto set my hand this 2d day of March, 1899.

HAROLD W. BUCK.

Witnesses:
 BENJAMIN B. HULL,
 MABEL E. JACOBSON.